United States Patent [19]
Cox

[11] Patent Number: 5,853,218
[45] Date of Patent: Dec. 29, 1998

[54] SAFETY ARM REST

[75] Inventor: Robert Cox, Akron, Ohio

[73] Assignee: Robert L. Cox, Akron, Ohio

[21] Appl. No.: 924,452

[22] Filed: Aug. 28, 1997

[51] Int. Cl.[6] ........................................................ B60J 9/00
[52] U.S. Cl. ................ 296/153; 297/411.22; 292/DIG. 2
[58] Field of Search ........................ 296/153; 297/411.22, 297/411.2; 292/346, DIG. 2, DIG. 54, DIG. 65

[56] References Cited

U.S. PATENT DOCUMENTS

| | | | |
|---|---|---|---|
| 1,374,907 | 4/1921 | Cofrode | 296/153 |
| 3,129,974 | 4/1964 | Carter | 296/153 |
| 4,101,155 | 7/1978 | Cohen | 292/DIG. 2 X |
| 4,932,708 | 6/1990 | Taub | 292/DIG. 2 X |

FOREIGN PATENT DOCUMENTS 795151  5/1958  United Kingdom ............... 297/411.22

*Primary Examiner*—Joseph D. Pape
*Assistant Examiner*—Jason Morrow
*Attorney, Agent, or Firm*—Emerson & Associates; Roger D. Emerson; Mark E. Duell

[57] ABSTRACT

An arm rest for use with the door of a motor vehicle is disclosed which provides comfort and added safety feature for the driver or passenger of the motor vehicle. The arm rest preferable includes a base, a leg which is inserted between a panel of the door and the window, and a padded portion on which the driver or passenger may rest his or her arm during operation of the motor vehicle. Raised projections on the leg of the arm rest secure the arm rest in the door. A high-friction material, such as rubber, prevents the arm rest from slipping or scratching the molding on the door. The arm rest also contains a padded portion which is supported by a support member such as wood, and consists of foam padding covered by a cloth or vinyl cover. The arm rest may contain a notch for receive the post of an door lock. The arm rest may also have a canopy on the base for covering the door lock to prevent an intruder or thief from unlocking the motor vehicle door. A method of using the apparatus is also disclosed.

19 Claims, 5 Drawing Sheets

SAFETY ARM REST

BACKGROUND OF THE INVENTION

1. Field of Invention

This invention pertains to the art of methods and apparatuses for providing comfort and safety to the driver or passenger of a motor vehicle, and more specifically to methods and apparatuses for providing an arm rest for the driver of a motor vehicle that also acts as a safety device by preventing a potential car jacker from unlocking the motor vehicle's door.

2. Description of the Related Art

Many drivers and passengers in motor vehicles, most notably automobiles, like to drive or ride with the windows in the doors rolled down. Many drivers and passengers also like to rest their arms on the top of the door for comfort. However, because the top of the door, at the base of the window, because it is made out of metal and many times is either black or chrome colored, may be hot and uncomfortable.

Further, riding with the windows down posses a potential safety risk in which an attacker or potential car jacker may unlock a car door, open the door, and attack the driver or passenger of the motor vehicle.

Applicant recognized the need to provide an arm rest which could be used with a motor vehicle that also prevented a car door from being unlocked when the arm rest was in place.

The present invention contemplates a new and improved arm rest for use with motor vehicle which is simple in design, effective in use, and overcomes the foregoing difficulties and others while providing better and more advantageous overall results.

SUMMARY OF THE INVENTION

In accordance with the present invention, a new and improved arm rest for use with a motor vehicle is provided which provides comfort for the operator or passenger of a motor vehicle while increasing safety of operating the motor vehicle with the door windows rolled down.

More particularly, in accordance with the present invention, an arm rest for use with a motor vehicle is disclosed, said motor vehicle having a door, the door having a first panel, a second panel, a molding on top of the first panel, a window located in between the first and second panels, a locking apparatus for locking the door, the locking apparatus having a lock, the lock having a post and a knob and an apparatus for raising and lowering the window. The arm rest includes a base, which has a top, a bottom, and an edge, the base has a notch for receiving the post of the lock and a knob covering apparatus for covering the knob of the lock. The knob is disposed between the top of the base and the knob covering apparatus. The knob covering apparatus includes a canopy attached to the base that extends out of the top of the base and covers the notch. The arm rest further includes a leg extending transversely from the edge of the base to be disposed between the window and the first panel of the door. The leg has raised projections for engaging the first panel of the door. The raised projections are raised from the surface of the leg between 2 mm and 7 mm. The arm rest also includes a padded portion attached to the top of the base. The padded portion has a substantially stiff board attached to the base, a padding attached to the board and a cover surrounding the board and the padding. The arm rest further includes an interfacing apparatus for interfacing between the base and the molding. The interfacing means prevents the base from scratching the molding and prevents the base from sliding horizontally along the molding.

According to another aspect of the present invention, an arm rest for use with a motor vehicle is disclosed, the motor vehicle having a door, the door having a first panel, a second panel, a molding on top of the first panel, a window located in between the first and second panels, and an apparatus for raising and lowering the window. The arm rest includes a base. The base has a top, a bottom, and an edge. The arm rest also includes a leg extending transversely from the edge of the base disposed between the window and the first panel of the door. The arm rest further includes a padded portion attached to the top of the base.

According to an other aspect of the present invention, an arm rest for use with a motor vehicle is disclosed. The motor vehicle has a door which has a first panel, a second panel, a molding on top of the first panel, a window located in between the first and second panels, a locking apparatus for locking the door which includes a lock, the lock including a post and a knob, and an apparatus for raising and lowering the window. The arm rest includes a base. The base has a top, a bottom, and an edge. The base has a notch for receiving the post of the lock and a knob covering apparatus for covering the knob of the lock. The knob is disposed between the top of the base and the knob covering apparatus. The arm rest also includes a leg extending transversely from the edge of the base which is disposed between the window and the first panel of the door.

According to another aspect of the present invention, a method of securing a lock for a door of a motor vehicle is disclosed with an arm rest. The door has a first panel, a second panel, a window located between the first and second panels, and means for raising and lowering the window. The lock has a post and a knob. The arm rest has a base with a top, a bottom, and an edge, a leg extending transversely from the edge of the base and disposable between the window and the first panel of the door. The base has a notch for receiving the post of the lock and a canopy attached to the base. The canopy extends out of the top of the base and covers the notch. The knob is disposable between the top of the base and the canopy. The method includes the steps of locking the door by engaging the lock, inserting the leg of the arm rest between the window and the first panel of the door, and sliding the arm rest over top of the lock in a manner such that the post of the lock is inserted into the notch and the canopy covers the knob.

One advantage of the present invention is that the arm rest provides padded comfort for the driver or passenger of a motor vehicle.

Another advantage of the present invention is that the arm rest is preferably covered with a material that does not achieve the temperatures of the metal of the door, thereby providing comfort for the drive or the passenger of the motor vehicle.

Another advantage of the present invention is that it covers the lock on a door, thereby preventing another individual from unlocking the door when the arm rest is engaged.

Another advantage of the present invention is that the arm rest does not damage or scratch the door.

Another advantage of the present invention is that the raised projections in the leg of the arm rest secures the arm rest in position.

Another advantage of the present invention is that the arm rest is portable and may be removed from the motor vehicle.

Still other benefits and advantages of the invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein.

DESCRIPTION OF THE PREFERRED EMBODIMENT

Figure 1:
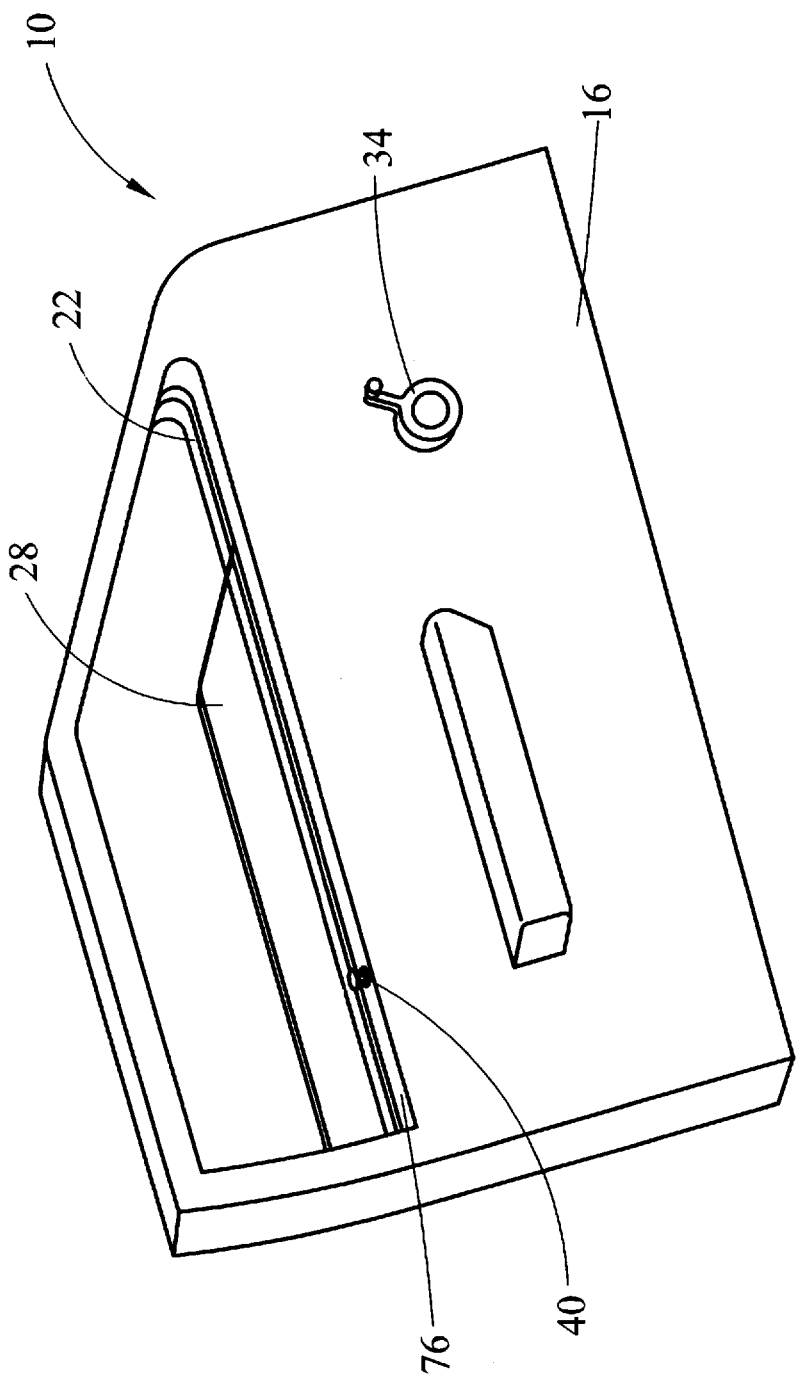
FIG. 1 is a perspective view of a motor vehicle door.

Referring now to the drawings wherein the showings are for purposes of illustrating a preferred embodiment of the invention only and not for purposes of limiting the same, FIG. 1 shows a perspective view of an automobile door 10.

The automobile door 10 preferably has a first, inside panel 16 and a second, outside panel 22. A window 28 is located between the first inside panel 16 and second outside panel 22 and may be raised and lowered in any suitable fashion, such as by a handle 34 as shown in FIG. 1 or by electronic power means. The door 10 further preferably has a locking apparatus that includes a lock 40. The present invention may also be used with a door 10 that has power locks located within the first inside panel 16 of the door 10.

Figure 2:
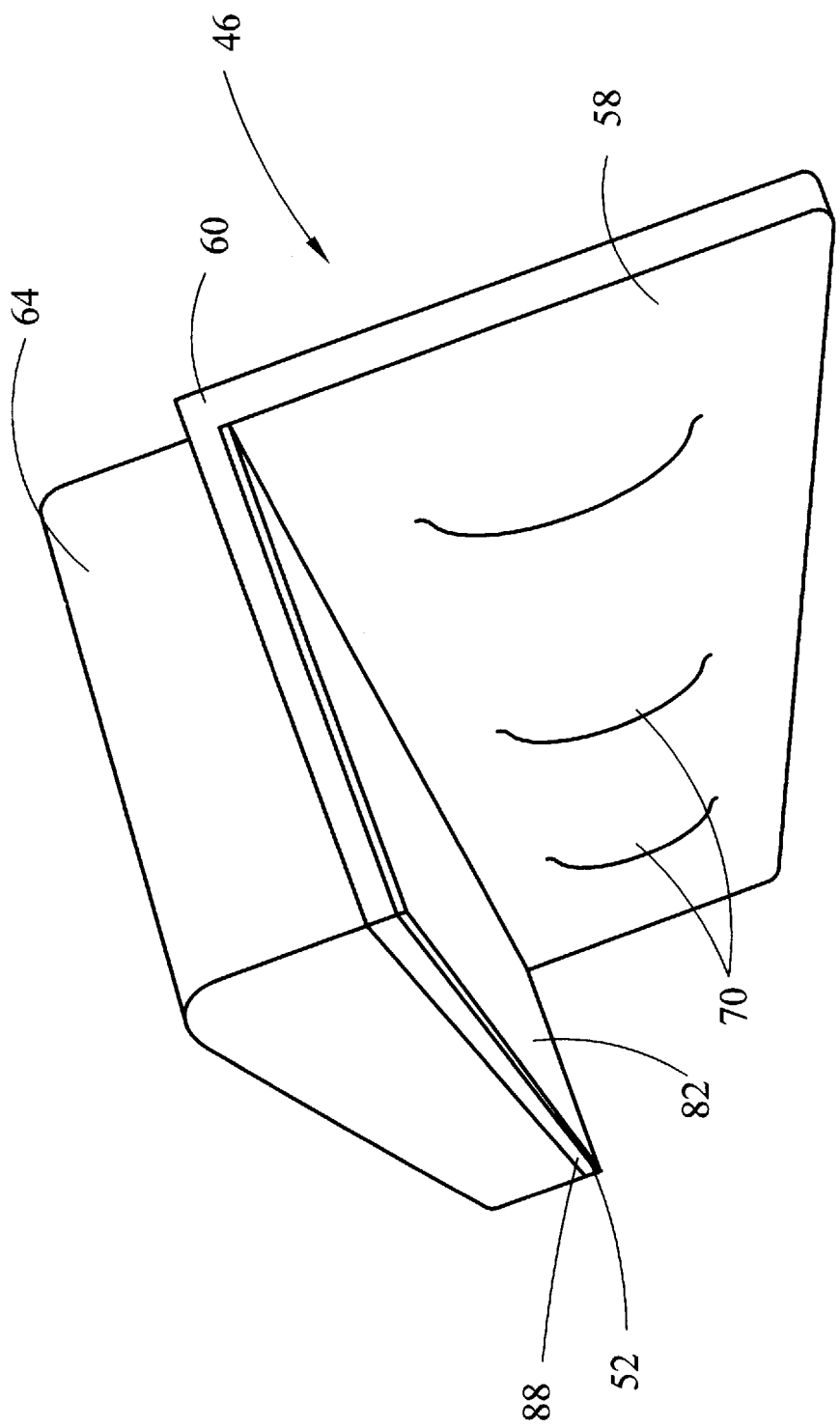
FIG. 2 is a perspective view of an arm rest for use with a motor vehicle door.
Figure 3:
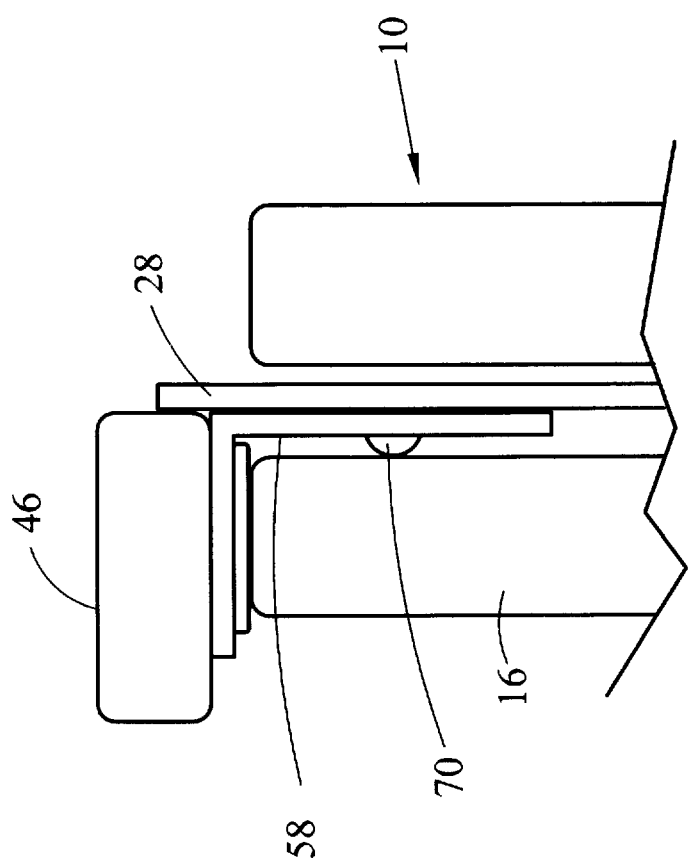
FIG. 3 is a cross-section of a door and arm rest.

FIG. 2 shows a preferred embodiment of arm rest 46. Arm rest 46 includes a base 52, a leg 58 which extends transversely from an edge 60 of the base 52, and a padded portion 64. Projecting from the leg 58 are a number of raised projections 70. The raised projections 70 may be raised from the surface of leg 58 between 2 mm and 7 mm, preferably 4 mm. The raised projections 70 engage the first inside panel 16 of the door 10, as illustrated by FIG. 3, when the arm rest 46 is placed in door 10 which the leg 58 between the first inside panel 16 and window 28. The raised projections 70 act as a means for securing the arm rest 46 and prevent the arm rest 46 from being easily removed from the door 10.

With continuing reference to FIGS. 1 and 2, the base 52 preferably has an apparatus for interfacing between the base 52 and the molding 76 on the top of the first inside panel 16 of the door 10, which is illustrated in FIG. 1. The means for interfacing between the base 52 and molding 76 is preferably a high-friction material that prevents the base 52 from sliding along molding 76 and prevents base 52 from scratching molding 76. The high-friction material is preferably a strip of rubber 82 attached to the bottom 88 of base 52. The high-friction material may also be composed of any other suitable material, such as a plastic compound.

In an preferred embodiment of the present invention, the base 52 and leg 58 are formed from a single piece of metal. However, base 52 and leg 58 may be made of separate pieces, and any suitable material may be used for base 52 and leg 58 such as metal, plastic, rubber or any other suitable material.

Figure 4:
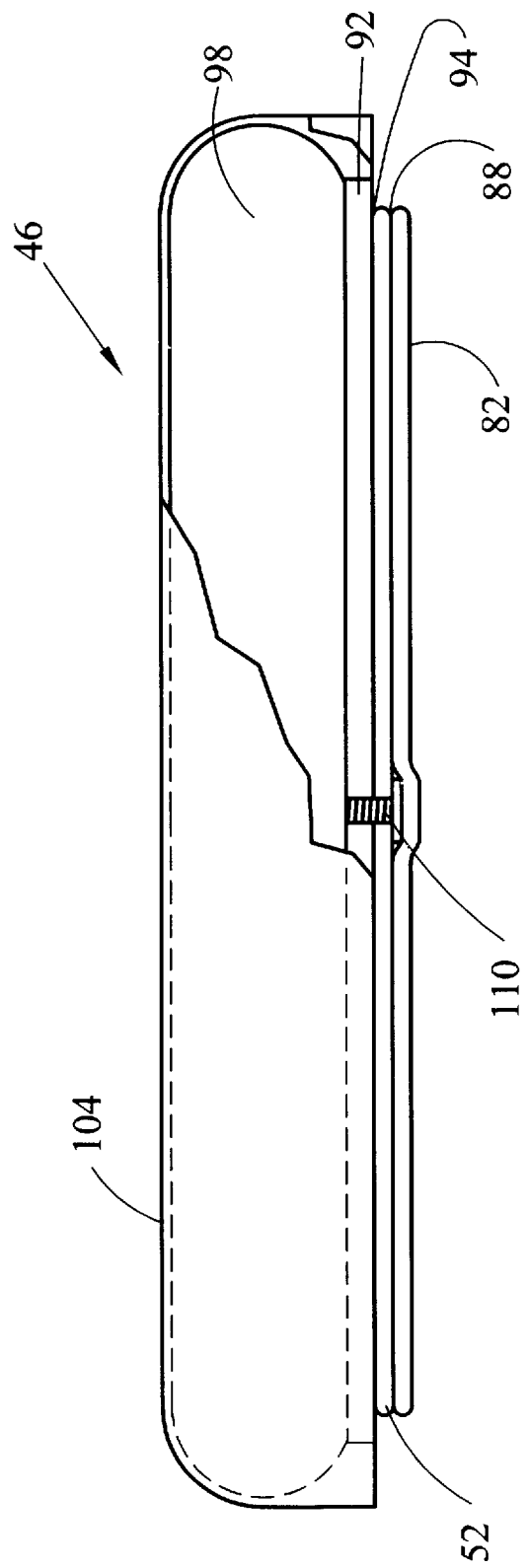
FIG. 4 is a cross-sectional view of the arm rest.

With reference to FIG. 4, the padded portion 64 of the arm rest 46 preferably includes a block of wood 92, or other suitable material, that is fixably attached to the top 94 of base 52. The block of wood 92 is used as a support for the foam padding 98 that provides the comfort for the user of the arm rest 46. The wood 92 and foam padding 98 are preferably surrounded by a cover 104 that is made of a sturdy cloth, vinyl, or any other suitable material. The padded portion 98 is preferably attached to base 52 by at least one screw 110 or any other suitable means for connecting the padded portion 64 to the base 52. In the preferred embodiment, screw 110 is covered on the bottom 88 of base 52 by the strip of rubber 82 or whatever other material is used for the interfacing apparatus.

Figure 5:
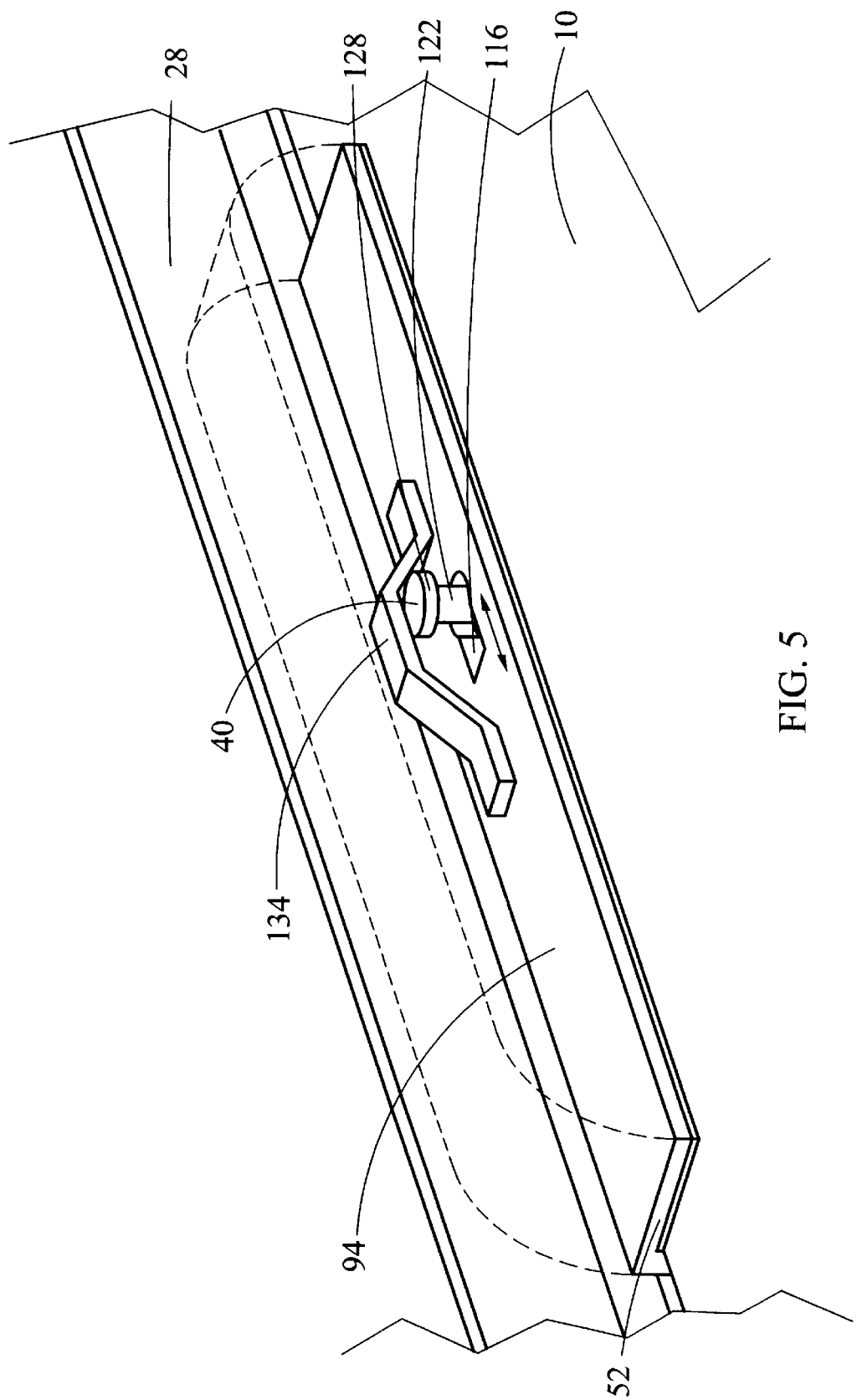
FIG. 5 is a perspective view of an alternate embodiment of a the present invention featuring a safety feature.

FIG. 5 shows a view of a safety feature associated with the preferred embodiment of the arm rest 46. A notch 116 is cut into base 52. The notch 116 is cut to correspond with lock 40. Lock 40 includes a post 122 and knob 128. The post 122 is received within notch 116. The knob preferably sits on the top 94 of base 52 and is covered by canopy 134 attached to base 52. With the arm rest 46 located over the lock 40, and intruder may not reach in through an open car window 28 and unlock the door 10. This feature helps to prevent theft or carjacking.

The preferred embodiments have been described, hereinabove. It will be apparent to those skilled in the art that the above methods may incorporate changes and modifications without departing from the general scope of this invention. It is intended to include all such modifications and alterations in so far as they come within the scope of the appended claims or the equivalents thereof.

Having thus described the invention, it is now claimed:

1. An arm rest for use with a motor vehicle, said motor vehicle having a door, said door having a first panel, a second panel, a molding on top of said first panel, a window located in between said first and second panels, locking means for locking said door comprising a lock, said lock having a post and a knob, and means for raising and lowering said window, said arm rest comprising:

a base having a top, a bottom, and an edge, said base having a notch for receiving said post of said lock, said base having knob covering means for covering said knob of said lock, said knob being disposed between said top of said base and said knob covering means, said knob covering means comprising a canopy attached to said base, said canopy extending out of said top of said base and covering a portion of said notch;

a leg extending transversely from said edge of said base and being disposed between said window and said first panel of said door, said leg having raised projections for engaging said first panel of said door, said raised projections being raised from a surface of said leg between 2 mm and 7 mm;

a padded portion attached to said top of said base, said padded portion having a substantially stiff board attached to said base, a padding attached to said board, and a cover surrounding said board and said padding; and, interfacing means for interfacing between said base and said molding, said interfacing means preventing said base from scratching said molding and preventing said base from sliding horizontally along said molding.

2. An arm rest for use with a motor vehicle, said motor vehicle having a door, said door having a first panel, a second panel, a molding on top of said first panel, a window located in between said first and second panels, locking means for locking said door comprising a lock, said lock having a post and a knob, and means for raising and lowering said window, said arm rest comprising:

a base having a top, a bottom, and an edge, said base having a notch for receiving said post of said lock, said base having knob covering means for covering said knob of said lock, said knob being disposed between said top of said base and said knob covering means; and, a leg extending transversely from said edge of said base and being disposed between said window and said first panel of said door.

3. The arm rest of claim 2 wherein said leg comprises:

securing means for securing said leg between said window and said first panel of said door.

4. The arm rest of claim 3 wherein said securing means comprises:

raised projections in said leg, said raised projections engaging said first panel of said door.

5. The arm rest of claim 4 wherein said raised projections are raised from a surface of said leg between 2 mm and 7 mm.

6. The arm rest of claim 5 wherein said raised projection are raised from said surface of said leg approximately 4 mm.

7. The arm rest of claim 2 further comprising:

interfacing means for interfacing between said base and said molding, said interfacing means preventing said base from scratching said molding and preventing said base from sliding horizontally along said molding.

8. The arm rest of claim 7 wherein said interfacing means comprises:

a high-friction material attached to said bottom of said base.

9. The arm rest of claim 8 wherein said high-friction material is rubber.

10. The arm rest of claim 8 wherein said high-friction material is plastic.

11. The arm rest of claim 10 wherein said padded portion comprises:

a substantially stiff board attached to said base;

a padding attached to said board; and, a cover surrounding said board and said padding.

12. The arm rest of claim 11 wherein said padding is made of foam.

13. The arm rest of claim 11 wherein said board is made of wood.

14. The arm rest of claim 11 wherein said cover is made of vinyl.

15. The arm rest of claim 11 wherein said cover is made of cloth.

16. The arm rest of claim 10 wherein said padded portion is attached to said base by at least one screw.

17. The arm rest of claim 2 further comprising:

a padded portion attached to said top of said base.

18. The arm rest of claim 2 wherein said knob covering means comprises:

a canopy attached to said base, said canopy extending out of said top of said base and covering a portion of said notch.

19. A method of securing a lock for a door of a motor vehicle with an arm rest, said door having a first panel, a second panel, a window located in between said first and second panels, and means for raising and lowering said window, said lock having a post and a knob, said arm rest having a base, said base having a top, a bottom, and an edge, and a leg extending transversely from said edge of said base and being disposable between said window and said first panel of said door, said base having a notch for receiving said post of said lock and a canopy attached to said base, said canopy extending out of said top of said base and covering a portion of said notch, said knob being disposable between said top of said base and said canopy, said method comprising the steps of:

locking said door by engaging said lock;

inserting said leg of said arm rest between said window and said first panel of said door; and, sliding said arm rest over top of said lock in a manner such that said post of said lock is inserted into said notch and said canopy covers said knob.

\* \* \* \* \*